United States Patent Office 3,207,084
Patented Sept. 21, 1965

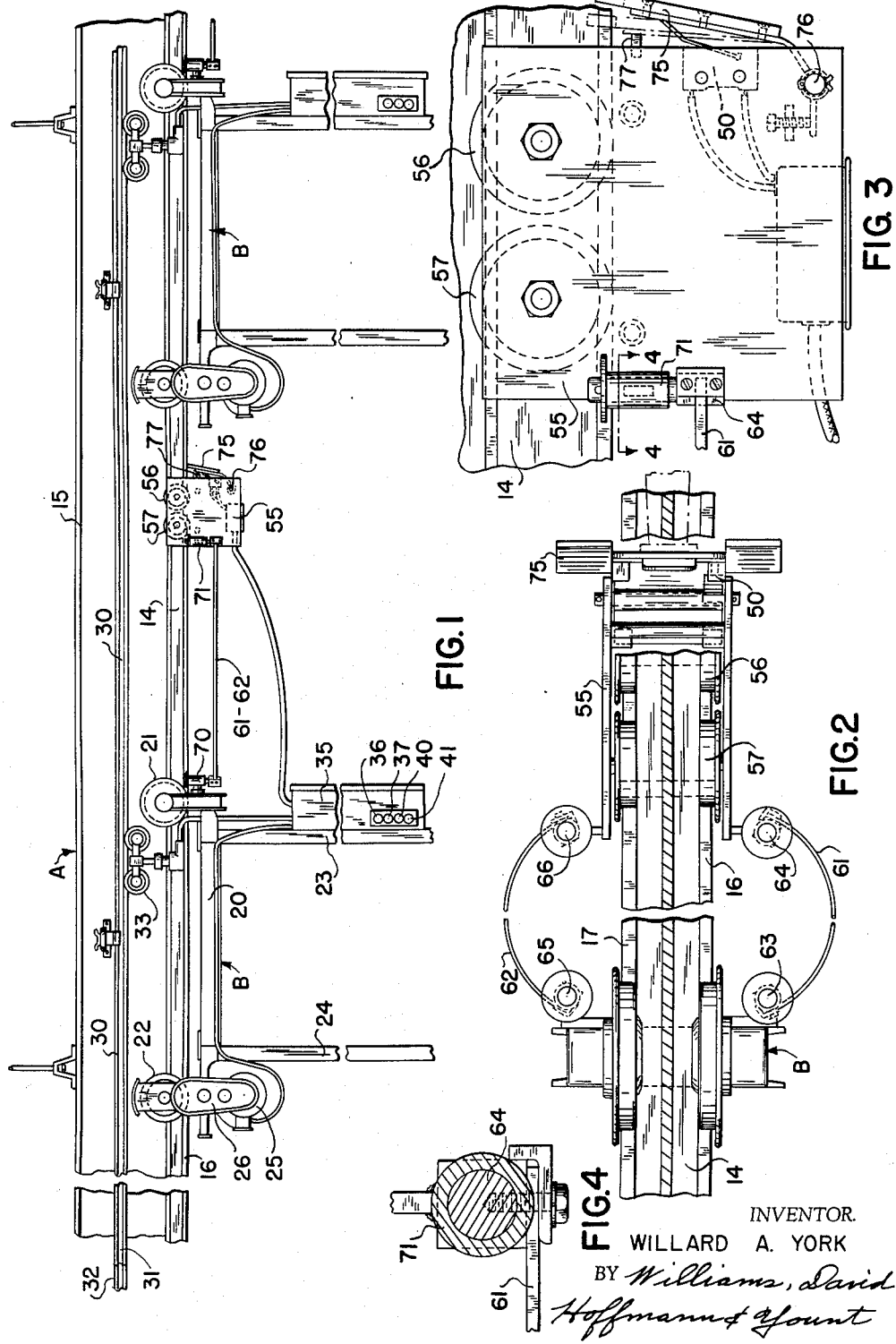

3,207,084
OVERHEAD MATERIAL HANDLING SYSTEM
Willard A. York, Cleveland, Ohio, assignor to The Cleveland Crane & Engineering Company, Wickliffe, Ohio, a corporation of Ohio
Filed July 12, 1963, Ser. No. 294,689
5 Claims. (Cl. 104—89)

The present invention relates to overhead monorail systems, and more particularly to such systems comprising carriers movable about the track by discrete motors located on the carriers and wherein one carrier may overtake another.

One of the principal objects of the invention is the provision of a new and novel overhead carrier system of the character referred to incorporating simple, reliable and inexpensive apparatus for preventing damage to the system including the carriers or a load upon a carrier in the event a carrier overtakes another either while the lead carrier is at rest or moving at a slower speed than a following carrier.

Another of the principal objects of the invention is the provision of a novel and improved material handling carrier for an overhead monorail material handling system of the character referred to which carrier includes apparatus at the leading or front end of the carrier for disconnecting the drive to the carrier in the event of the carrier overtaking a leading carrier.

Another of the principal objects of the invention is the provision of a novel and improved material handling carrier for an overhead monorail material handling system of the character referred to which carrier includes a yieldable bumper assembly at its front or leading end for absorbing the impact and disconnecting the drive to the carrier in the event of the carrier overtaking a leading carrier.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which:

FIG. 1 is a fragmentary side elevational view of an electrified overhead monorail material handling carrier system embodying the present invention;

FIG. 2 is a fragmentary sectional view of the system shown in FIG. 1 showing in plan the right-hand portion of the left-hand carrier with parts in a different operating position;

FIG. 3 is an enlarged fragmentary view of a portion of FIG. 1; and

FIG. 4 is a sectional view approximately on the line 4—4 of FIG. 3.

While the invention is susceptible of various modifications and alternative constructions and may be incorporated in differently constructed carrier systems, the system herein shown and described as illustrative of the invention comprises an overhead monorail track A comprising a rail 14 welded to the lower edge of a T-beam 15 and having lower horizontal flanges 16 and 17 upon which a plurality of load carriers B are supported for movement along the rail from one location to another. Each of the carriers comprises a frame 20 suspended from the rail 14 by two pairs of flanged wheels 21 and 22 and including depending members 23, 24 upon which the load is supported. The lower part of the frame, that is, the part on which the load is supported, is not shown and may be of any suitable construction depending upon the type of load to be carried.

Each of the carriers B is adapted to be moved along the monorail track A by an electric motor 25 located on the carrier and connected by a suitable drive connection to one or more of the flanged wheels 21 and 22. In the embodiment shown, the motors 25 are connected to the wheels 22 on the rear end of the carriers by gear drives located within gear cases 26. Alternatively, the motors may be connected to drive the carriers in any suitable manner as by being operatively connected to a drive wheel engaging the lower web of the rail.

The electric motors shown are three-phase alternating current motors and the power for driving them is obtained from three conductor bars 30, 31, 32 mounted alongside the track and continuously engaged by discrete current collectors 33, only one of which is shown. The current collectors of the respective carriers are continuously in contact with their respective conductor bars and are connected by suitable electric wires to a control panel in a control cabinet 35 mounted on the carrier. Each control cabinet is provided with forward and reverse jog push button switches 36, 37, a continuous forward push button switch 40, and a stop push button switch 41 readily accessible to an operator for controlling operation of the drive motor for the carrier of which the control cabinet is a part. The control circuits for the carrier drive motors are conventional except for the fact that the energizing circuit for the motor forward contactor coil, which circuit is established upon actuation of the continuous forward switch 40, has a normally closed limit switch 50, see FIG. 3, in series circuit therein, and which when opened breaks the circuit to the motor forward contactor coil or prevents the circuit therefor from being established, as the case may be.

The switch 50 associated with each load carrier is carried by a frame assembly 55 supported by pairs of leading and trailing wheels 56, 57 on the rail 14 in advance of the load carrier proper and connected thereto by resilient means, which in the embodiment shown comprises a pair of fiber-glass rods 61, 62 about ⅛" x ¼" in cross section and about two and one-half feet long located at opposite sides of the carrier and rail. Opposite ends of each of the rods 61, 62 are detachably clamped to the outer sides, that is, the sides farthest from the track A of members 63, 64 and 65, 66, respectively, including cylindrical projections extending upwardly through cylindrical bosses 70, 71 carried by the frames 20 and 55. The cylindrical portions of the members 63–66 are prevented from dropping out of the bosses 70, 71 by washers attached to their upwardly projecting ends. The construction is such that the members 63–66 are supported in the bosses 70, 71, for rotation about vertical axes.

The switch 50 is suitably mounted in the frame 55 and is adapted to be actuated to open its normally closed contacts by rotation of a bumper or abutment assembly 75 from the position shown in full lines to the position shown in phantom lines, that is, dot-dash lines, in FIG. 3. The bumper assembly 75 is pivoted by a pin 76 to the lower right-hand end of the frame 55, as viewed in the drawings, and normally projects forwardly of the frame and is otherwise constructed so as to engage the trailing end of a leading carrier when the carrier of which it forms a part overtakes a leading carrier.

When the bumper assembly 75 of the carrier engages a leading carrier, the assembly is rotated in a counterclockwise direction, as viewed in the drawings, into engagement with a stop 77 and actuates the switch 50 to disconnect the power from the driving motor of the carrier. If the carrier has sufficient momentum and the resistance offered by the leading carrier is substantial, the carrier will move forward along the rail 14 toward the frame 55 in which event the rods 61, 62 bow outwardly, as illustrated in FIG. 2. The rods 61, 62 bow outwardly rather than inwardly because their connection with the members 63 to 66 is outwardly of the axis of rotation of said members. When the leading carrier is moved or moves forwardly so as to disengage the bumper assembly of the trailing carrier therefrom, the circuit to the drive motor of the carrier which was previously interrupted is re-established and the carrier again moves forwardly along the rail 14.

While the preferred embodiment of the invention has shown and described in considerable detail, the invention is not limited to the particular construction shown. As illustration of alternative constructions, the switches 50 could be utilized to operate a magnetic or other type clutch, the pivoted bumper member 75 could be slidably supported in the frame 55, resilient means other than the rods 61, 62 could be employed, etc., and it is the intention to hereby cover all adaptations, modifications and uses of the invention disclosed and coming within the appended claims.

Having thus described my invention, what I claim is:

1. In an overhead material handling system including an electrified overhead monorail track and a plurality of carriers movable about said track by electric motors mounted on the respective carriers, an apparatus for cushioning the impact between and disconnecting the power to the driving motor of a trailing carrier in the event it overtakes a leading carrier comprising frame means adapted to be supported on said track in advance of a carrier, resilient means having one end operatively connected to said frame means and its other end adapted to be operatively connected to the front end of said carrier, switch means carried by said frame means and adapted to be connected in the control circuit of the driving motor of said carrier for discontinuing the drive for said carrier upon actuation of said switch means, an abutment member movably connected to said frame means and positioned to engage and be moved in one direction relative to said frame means by a leading carrier upon a carrier to which it is connected overtaking another carrier, means on said frame means limiting movement of said abutment member in said one direction, and means for actuating said switch means upon movement of said abutment member in said one direction.

2. In an overhead material handling system including an electrified overhead monorail track and a plurality of carriers movable about said track by electric motors mounted on the respective carriers, an apparatus for cushioning the impact between and disconnecting the carrier drive for a trailing carrier in the event it overtakes a leading carrier comprising frame means adapted to be supported on the track in advance of a carrier and connected thereto by resilient means, switch means carried by said frame means and adapted to discontinue the drive for the carrier upon actuation of said switch means, an abutment member movably connected to said frame means and positioned to engage and be moved in one direction relative to said frame means by a leading carrier upon the carrier to which it is connected overtaking another carrier, means on said frame means limiting movement of said abutment member in said one direction, and means for actuating said switch means upon movement of said abutment member in said one direction.

3. In an overhead material handling system including an electrified overhead monorail track, a plurality of carriers movable about said track by electric motors mounted on the respective carriers, frame means supported on the track in advance of each of a plurality of said carriers, resilient means connecting said frame means to the carrier immediately therebehind, switch means carried by each of said frame means and connected in the control circuit of the driving motor of said carrier to which said frame means is connected for disconnecting the carrier drive upon actuation of said switch means, abutment assemblies movably connected to said respective frame means in position to engage and be moved in one direction by a leading carrier upon said carrier with which it is associated overtaking another carrier, means on said frame means limiting movement of said abutment assemblies in said one direction, and means for actuating said switch means upon movement of said abutment member.

4. In a carrier assembly for an electrified overhead monorail track material handling system, a load carrier adapted to be supported on an overhead monorail track, a frame member adapted to be supported on said track in advance of said load carrier, a relatively thin, long, resilient rod having one end pivotally connected to said load carrier and the other end pivotally connected to said frame member, an electric motor mounted on said load carrier for propelling the same, switch means mounted on said frame member and adapted when actuated to disconnect said motor from its source of power, abutment means movably connected to said frame member and positioned to engage and be moved in one direction relative to said frame member by a leading carrier upon said carrier assembly of which it is a part overtaking another carrier, means on said frame member limiting movement of said abutment means in said one direction, and means for actuating said switch means upon movement of said abutment means in said one direction.

5. In an overhead material handling system including an electrified overhead monorail track and a plurality of carriers movable about said track by electric motors mounted on the respective carriers, an apparatus for cushioning the impact between and disconnecting the carrier drive for a trailing carrier in the event it overtakes a leading carrier including frame means adapted to be supported on the track in advance of a carrier, a relatively thin long resilient rod having one end adapted to be pivotally connected to said carrier and the other end pivotally connected to said frame means, switch means carried by said frame means and adapted to discontinue the drive for the carrier upon actuation of said switch means, an abutment member movably connected to said frame means and positioned to engage and be moved in one direction relative to said frame means by a leading carrier upon the carrier to which it is connected overtaking another carrier, means on said frame means limiting movement of said abutment member in said one direction, and means for actuating said switch means upon movement of said abutment member in said one direction.

References Cited by the Examiner

UNITED STATES PATENTS

| | | | |
|---|---|---|---|
| 505,406 | 9/93 | Link | 246—166 |
| 1,531,139 | 3/25 | Schauman. | |
| 1,821,284 | 9/31 | Banschbach | 293—68 |
| 1,988,855 | 1/35 | Neuman. | |
| 2,039,473 | 5/36 | Bennington | 104—149 |
| 2,573,361 | 10/51 | Rodgers et al. | 43—18 |

MILTON BUCHLER, *Primary Examiner.*

JAMES S. SHANK, LEO QUACKENBUSH, *Examiners.*